July 16, 1957 R. J. HANNON 2,799,736
RADIO FREQUENCY AMPLIFIER
Filed Nov. 3, 1953 3 Sheets-Sheet 1

INVENTOR.
ROBERT J. HANNON

BY Ostrolenk & Faber

ATTORNEYS

INVENTOR.
ROBERT J. HANNON
BY
Ostrolenk & Faber
ATTORNEYS

July 16, 1957 R. J. HANNON 2,799,736

RADIO FREQUENCY AMPLIFIER

Filed Nov. 3, 1953 3 Sheets-Sheet 3

INVENTOR.
ROBERT J. HANNON

BY
Ostrolenk & Faber
ATTORNEYS

United States Patent Office 2,799,736

Patented July 16, 1957

2,799,736

RADIO FREQUENCY AMPLIFIER

Robert J. Hannon, Huntington Station, N. Y., assignor to Standard Coil Products Co., Inc., Los Angeles, Calif., a corporation of Illinois Application November 3, 1953, Serial No. 389,991

6 Claims. (Cl. 179—171)

The present invention relates to electronic amplifiers and more particularly it relates to amplifiers operable at ultra-high frequencies.

It is well-known that considerable research is being made on how to extend the upper frequency limit of the operation of electron tubes as amplifiers. The research in this field has become particularly important with the advent of U. H. F. television broadcasting and the appearance on the market of electron tubes designed for operation at high frequencies.

In one of such tubes, for example, the grid and the plate are each provided with two terminal leads and the electrodes are so positioned that interelectrode capacitances are considerably reduced and may be of the order of magnitude of 1 micromicrofarad.

When it is attempted to raise the upper frequency limit of these tubes, a number of factors arise which up to now prevented the efficient operation of these tubes at the ultra-high frequencies desired.

It was found, in fact, that such tubes could not operate at a frequency above their self-resonant frequency due to the effects of interelectrode capacitances and cathode, grid and plate inductances.

The amplifier of the present invention, on the other hand, can be operated at frequencies considerably above the self-resonant frequency of the tube used.

Accordingly, one object of the present invention is an electronic amplifier capable of operation above the self-resonant frequency of the electron tube.

This is obtained partially by making the plate structure of the tube and the plate lead inductances part of the output resonator of the electronic amplifier.

Another object of the present invention is, therefore, the provision of means for compensating for the effect of plate lead inductances.

It is also well-known that the major problem in the attempts to obtain optimum noise factor in any amplifier at ultra-high frequencies is to devise means of inserting signal energy with minimum loss directly to the control electrodes or better directly to the points where the equivalent input noise energy is applied to the amplifier.

That such a problem exists is easily seen from the fact that the distributed inductance of the leads to the control electrodes (for example, cathode and grid) in combination with the shunt capacitance and resistance from the control electrodes to ground forms an L attenuator so that signal energy applied to its input will appear considerably decreased across the control electrodes, while the noise energy is applied directly across the control electrodes so that only a very poor noise factor is obtained.

This problem does not arise at lower frequencies since at these lower frequencies the inductances and capacitances of the electrodes will produce only an insignificant attenuation.

Consequently, it is necessary to connect to the input circuit of such an amplifier circuits for compensating the control electrodes attenuation to improve the noise factor.

A further object of the present invention is, therefore, the provision of means in an amplifier input circuit for improving the amplifier noise factor at ultra-high frequencies.

This is achieved in the present invention by the addition of electrical elements connected to the control electrodes which transform the input circuit from an L attenuator into a T network having as its equivalent a transformer with its secondary connected across the cathode to grid capacitance of the tube, the input resistance and the control electrodes to which as previously mentioned noise energy is also applied.

Since signal energy is now no longer attenuated to any considerable extent before it is applied to the control electrodes, the noise factor of the amplifier is considerably improved.

Furthermore, if the highest operating frequency of the amplifier is substantially lower than the self-resonant frequency of the secondary of this analog transformer and the cathode to grid capacitance, the transformer is not tuned and its components may remain fixed as the operating frequency is reduced.

Another object of the present invention is an R. F. amplifier operable with fixed components in the entire U. H. F. band.

The foregoing and many other objects of the invention will become apparent in the following description and drawings in which.

Figure 4:
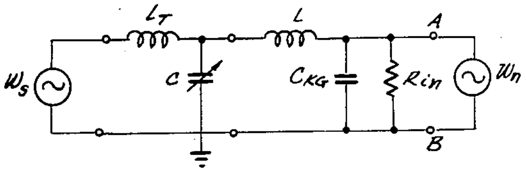
Figure 4 is a schematic diagram of the T network input circuit of the present invention.
Figure 4A:
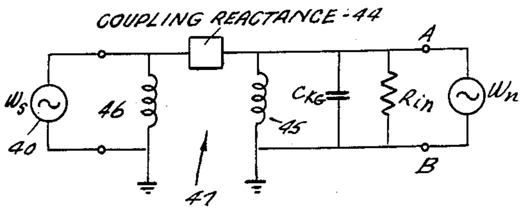

Figure 4A is the equivalent circuit of the T network input circuit of the present invention showing the resulting U. H. F. transformer.

Figure 5:
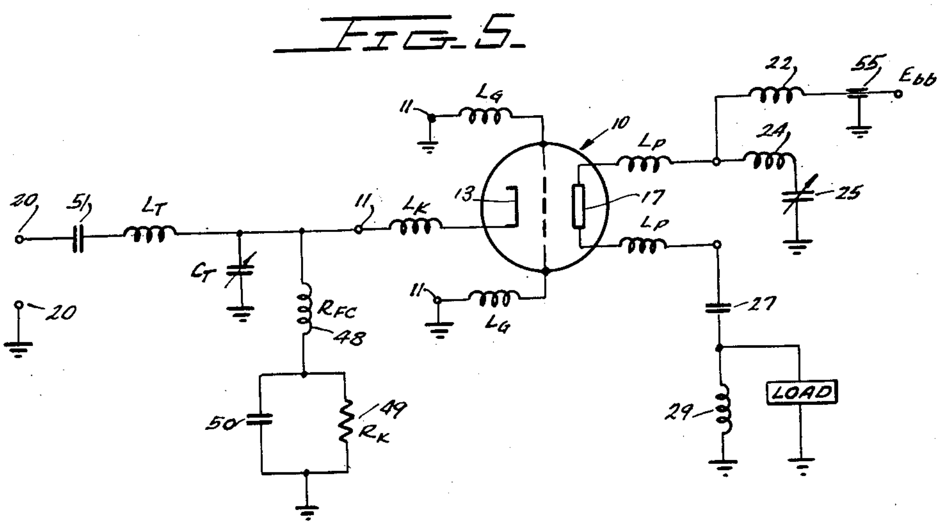

Figure 5 is the complete circuit diagram of the high frequency amplifier of the present invention showing also the cathode, grid and plate lead inductances.

Figure 6:
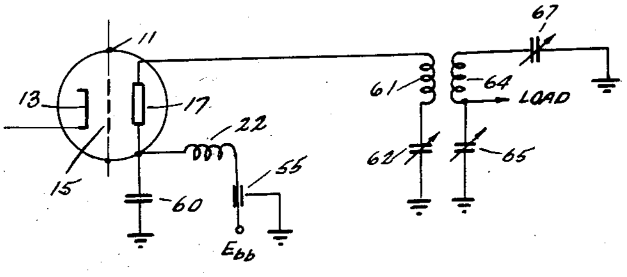

Figure 6 is a detail of the R. F. amplifier of the present invention showing a doubly tuned output circuit.

Figure 1:
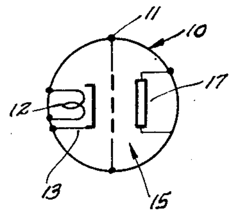
Figure 1 is a schematic diagram of the high frequency tube.

Referring now to Figure 1 showing the schematic diagram of a high frequency tube such as the 6AF4, it will there be seen that the tube 10 is provided with seven pins 11, of which two pins serve as terminals for the filament 12, one pin serves as terminal for the cathode 13, two more pins serve as terminals for the grid 15 and the last two pins serve as terminals for the plate 17.

Thus, the main difference between this tube and conventional low frequency tubes is in the fact that both grid 15 and plate 17 of tube 10 are each provided with two terminals 11.

As is well-known in the art, such a tube will be capable of operating at higher frequencies than conventional tubes due to the reduced effects of grid and plate lead inductances.

Figure 1A:
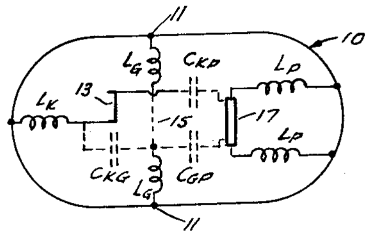
Figure 1A is the exact equivalent circuit of the tube of Figure 1.

Referring now to Figure 1A showing the lead inductances $L_K$, $L_G$, $L_P$ and the interelectrode capacitances $C_{KG}$, $C_{GP}$ and $C_{KP}$, it should be noted that the lead inductances of the grid and plate, namely $L_G$ and $L_P$ are now on each side of the grid 15 and each side of the plate 17, while the cathode 13 has a single inductance $L_K$. These inductances arise from the fact that the cathode 13, grid 15 and plate 17 are not connected directly to the pins 11 but through appropriate leads and although at lower frequencies the inductances of such leads may be negligible, at the higher frequencies they all become important and must be taken into consideration.

In the schematic diagram of Figure 1A, filament 12 was not shown since it would be positioned in the manner shown in Figure 1.

The lead inductances $L_K$, $L_G$ and $L_P$ and the interelectrode capacitances $C_{KG}$, $C_{GP}$ and $C_{KP}$ affect the operation of this tuner at the higher frequencies, for example in the U. H. F. range, since they determine a frequency of self-resonance at which tube 10 will resonate if no other circuit element is connected to tube 10 except for the power supplies.

If it is attempted to operate tube 10 above self-resonant frequency in a conventional amplifier, it is found that the lead inductances of the plate, cathode and grid will considerably attenuate the desired high frequency signal from the expected value, thus making the signal to noise ratio considerably worse than at low frequencies.

In other words, the noise factor of such an amplifier is considerably worsened at the higher frequencies due to the attenuation of the high frequency signals with respect to noise energy.

Figure 2:
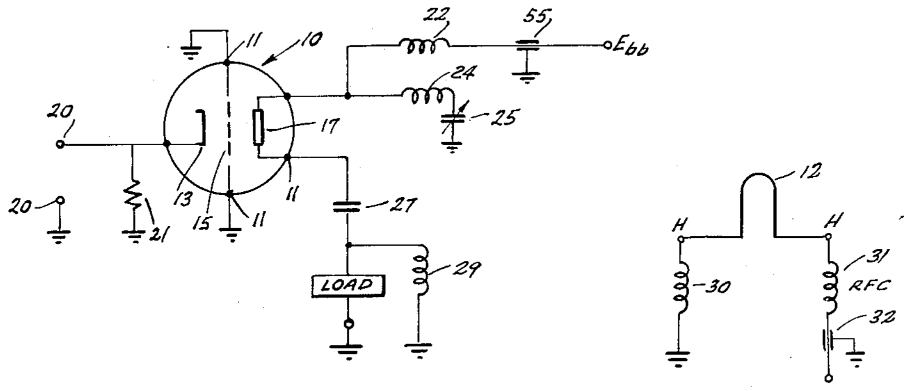
Figure 2 is an electrical diagram of a high frequency amplifier showing the plate structure and the plate inductances as part of the output resonator.

Figure 2 shows a high frequency amplifier using the tube 10 of Figures 1 and 1A in which the plate circuit is modified so as to make the plate structure 17 and its lead inductances $L_P$, which are, of course, distributed, part of the output resonator and thus compensate for the effect of the plate structure 17 and lead inductances $L_P$.

In describing Figure 2, the elements of tube 10 already shown in Figure 1 will be denoted by the same numbers as in Figure 1.

Tube 10 is connected as a grounded grid amplifier so that both terminals 11 of tube 10 and, therefore, grid 15 are connected to ground. Cathode 13 is connected to input terminals 20 and shunt resistance 21 connected between cathode 13 and ground and across which the input signal will appear.

The plate 17 of tube 10 has one of its terminals 11 connected to the power supply $E_{bb}$ through an R. F. choke 22 and is also connected to ground through a series L–C circuit consisting of inductance 24 and trimmer capacitance 25. The other terminal of pin 11 of plate 17 is connected to the load of this amplifier through a coupling capacitor 27, the load itself being in parallel with coil 29.

The output signal from tube 10 thus appears across coil 29 and is, therefore, applied to the desired load.

Figure 2A:
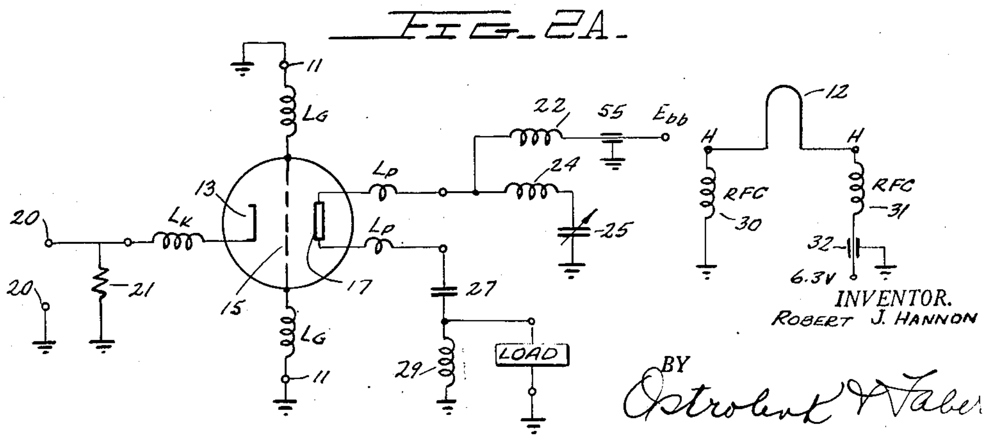
Figure 2A is a circuit diagram of the amplifier of Figure 2 showing also the lead inductances.

The function of the series circuit 24—25 is to make the lead inductances $L_P$ and the plate structure 17 of tube 10 part of the output resonator 24—25 as can be seen more clearly in Figure 2A which shows the circuit of Figure 2 with also the distributed inductance of cathode 13, grid 15 and plate 17.

The filament 12 is connected on one side to an R. F. choke 30 and on the other side to an R. F. choke 31. Choke 31 is connected to an appropriate filament supply through a feed through capacitor 32 in a manner well-known in the art so as to make filament 12 floating at the desired high frequencies.

Figure 2B:
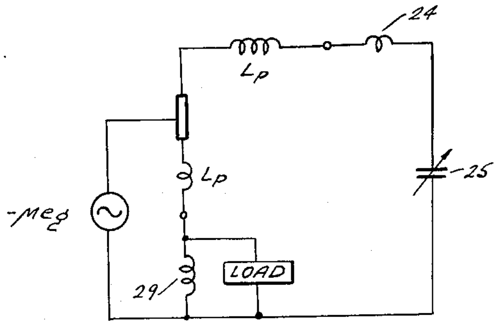
Figure 2B is the equivalent plate circuit of the amplifier of Figure 2A.

When a signal is applied across terminals 20 of the high frequency amplifier shown in Figures 2 and 2A, the cathode and grid inductances will as described hereinafter in connection with Figures 3 and 4 attenuate the signal energy, but the plate inductances $L_p$ which are now part of the output resonator (see also the equivalent circuit of Figure 2B) do not substantially modify the amplified signal or, in other words, do not affect any longer in any substantial way the operation of this amplifier at high frequencies, for example at frequencies in the U. H. F. region, namely from approximately 400 to about two thousand megacycles.

It was mentioned previously that in the grounded grid amplifier described in connection with Figure 2 the control electrode inductances $L_K$ and $L_G$ contribute to attenuate the signal energy if the signal energy is applied conventionally to the pins 11 of the control electrodes 13 and 15.

Figure 3:
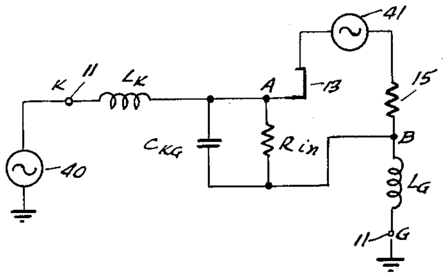
Figure 3 is a schematic diagram of the equivalent input circuit of the grounded grid amplifier.
Figure 3A:
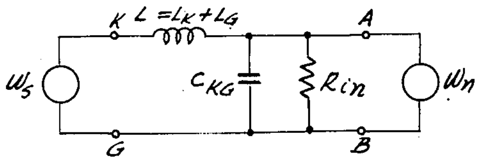
Figure 3A is a simplified equivalent circuit of the input circuit of Figure 3.

More specifically, referring to the input circuit of the amplifier under consideration shown in Figure 3 and its equivalent circuit shown in Figure 3A, it will there be seen that when the signal generator 40 is connected between the terminal 11 of cathode 13 and terminal 11 of grid 15, the signal energy is actually applied to the input of an L attenuator consisting of the control electrode inductances $L_K$ and $L_G$ and the shunt capacitance and resistance $C_{KG}$ and $R_{in}$, respectively.

In other words, the signal energy produced by signal generator 40 is considerably attenuated before it appears across the actual control electrode terminals A and B to which instead may be considered directly connected noise generator 41. Thus, while the equivalent noise generator 41 is directly connected between cathode 13 and grid 15 of this amplifier, the signal generator is connected to an attenuator whose output is connected between cathode 13 and grid 15 of this amplifier. Thus, with such a conventional circuit, the signal energy is reduced, the noise energy remains the same and as a consequence of this the noise factor of such an amplifier may be quite poor.

Figure 3A shows the simplified equivalent input circuit of the amplifier of Figure 3 and referring thereto, since the input conductance $$G=\frac{1}{R_{in}}$$

is approximately equal to $G_m$ when $\mu+1$ is approximately equal to $\mu$, it may be thought possible to utilize the shunt elements $C_{KG}$ and $R_{in}$ as part of a $\pi$ network. On the other hand, this is not very satisfactory unless $R_{in}$ is sufficiently large with respect to $W_L$. This is difficult since $R_{in}$ which is approximately equal to $$\frac{1}{G_m}$$

is generally small. In fact, if $G_m=10^4$ micromhos and $\mu+1$ is approximately equal to $\mu$, then $R_{in}$ will be approximately equal to 100 ohms.

Since, therefore, $C_{KG}$ and $R_{in}$ cannot satisfactorily be changed, the only element on which it is possible to operate to improve the performance of such an amplifier is the inductance L (see Figure 3A), sum of the cathode lead inductance $L_K$ and the grid lead inductance $L_G$.

In the present invention this inductance L is made part of a T network (see Figure 4) by adding to it an external inductance $L_T$ and a shunt capacitance $C_T$, for example a trimmer capacitance.

The T network consisting of elements $L_T$, L, and $C_T$ is analogous to a transformer and (see Figure 4A) the secondary 45 of this analog transformer 47 is connected directly across terminals A and B of cathode 13 and grid 15, respectively, to which, as previously mentioned, it may be assumed that the noise generator 41 is connected.

The primary side 46 of this analog transformer 47 obtained from the T network $L_T$—L—$C_T$ as may be seen in Figure 4A appears as connected to the signal energy generator 40. In other words, the shunt combination of $C_{KG}$ and $R_{in}$ represents now the output termination of analog transformer 47 and in conjunction with its transformation ratio serves to determine the effective input impedance of the amplifier.

The primary and secondary windings 46 and 45 of analog transformer 47 are coupled to each other by a coupling reactance shown at 44 of Figure 4A.

Figure 5 shows the complete circuit of the present amplifier showing not only the novel output resonator means but also the T network and input circuit.

In Figure 5 the cathode pin 11 is also shown connected to an R. F. choke 48 and to the parallel combination of a self-biasing resistor 49 and its by-pass capacitor 50 where circuits 49 and 50 determine the correct operating bias of this amplifier and radio frequency choke 48 serves to isolate the high frequency from the bias source 49—50.

It should be noted that by means of this circuit it is possible to operate at ultra-high frequencies with noise factors considerably lower than those obtainable with conventional amplifier circuits.

As an example, while with the conventional amplifier a noise factor of 18 db was measured, with the present high frequency amplifier a noise factor of 10.5 db was measured at 887 megacycles. When the amplifier is operated at a frequency substantially lower than the self-resonant frequency of the secondary 45 of analog transformer 47 and the cathode to grid capacitance $C_{KG}$, transformer 47 may be considered untuned and its components may remain fixed as the operating frequency is reduced.

Figure 6 shows a modification of the output circuit of the present R. F. amplifier. While the output circuit of the embodiment of Figure 5 is singly tuned, that of Figure 6 is doubly tuned.

Referring, in fact, to the embodiment of Figure 6, the plate 17 of R. F. amplifier tube 10 is connected on one side to the B+ supply $E_{bb}$ through choke 22 and feed-through capacitor 55. Circuit 22—55 is also by-passed to ground by capacitor 60.

The other side of plate 17 is connected to a series tuned circuit consisting of inductance 61 and variable capacitor 62. Coil 61 is mutually coupled to coil 64, the inductance of which is series tuned by capacitor 65. Another capacitor 67 connects the other side of coil 64 to ground. The load is connected in this case across capacitor 65.

In the circuit shown in Figure 5, the following values were used for the electrical components:

| | | |
|---|---|---|
| Coupling capacitor **51** | micromicrofarads | 120 |
| $C_T$ | do | 0.5–3.0 |
| By-pass capacitor **50** | do | 120 |
| Tube **10** | | 6AF4 |
| Capicitor **27** | micromicrofarads | 120 |
| Capacitor **25** | do | 0.5–3.0 |
| Feed through capacitor **55** for the plate supply | do | 1000 |
| Plate supply voltage | volts | 155 |
| RK | ohms | 200 |

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A grounded grid amplifier operable at U. H. F. and having a low noise factor comprising a multi-electrode electron tube having a cathode, grid and plate; said grid of said tube being effectively connected to ground at the operating frequencies through the grid lead inductance of said electron tube; an input circuit connected to said cathode of said tube and an output circuit connected from said plate of said tube; said input circuit being comprised of a series inductance and a shunt capacitor for compensating the cathode and grid lead inductance to thereby reduce the signal attenuation at U. H. F.; said series inductance and shunt capacitor forming in conjunction with said cathode and grid lead inductance of said tube an analog transformer for applying a non-attenuated signal across the inherent input resistance and capacitance of said electron tube.

2. A grounded grid amplifier operable at U. H. F. and having a low noise factor comprising a multi-electrode electron tube having a cathode, grid and plate; said grid of said tube being effectively connected to ground at the operating frequencies through the grid lead inductance of said electron tube; an input circuit connected to said cathode of said tube and an output circuit connected from said plate of said tube; said input circuit being comprised of a series inductance and a shunt capacitor for compensating the cathode and grid lead inductance to thereby reduce the signal attenuation at U. H. F.; said series inductance and shunt capacitor forming in conjunction with said cathode and grid lead inductance of said tube a T network for applying a non-attenuated signal across the inherent input resistance and capacitance of said electron tube in which said series inductance, said shunt capacitor and said cathode and grid lead inductance each form one leg.

3. A grounded grid amplifier operable at U. H. F. and comprising an electron tube, a cathode circuit, and a plate circuit; said electron tube being comprised of a plate, grid and cathode with a terminal associated with each of said electrodes; said electron tube having an inherent lead inductance between each of said terminals and its associated electrode at the U. H. F. operation of said amplifier; said grid terminal being effectively connected to ground at U. H. F.; said cathode circuit being operatively connected to said cathode terminal and said plate circuit being operatively connected to said plate terminal; said cathode circuit being comprised of a first inductor and a first capacitor operatively connected to compensate for said inherent lead inductance to thereby minimize signal attenuation at U. H. F.; said first inductor and said first capacitor each having an end connected to said cathode terminal at U. H. F. to thereby form an analog transformer with said lead inductance for applying a non-attenuated signal across a shunt combination of the inherent input resistance and inherent grid-cathode capacitance of said electron tube.

4. A grounded grid amplifier operable at U. H. F. being comprised of an electron tube and a cathode input circuit; said electron tube being comprised of a cathode, a plate and a grid; said cathode input circuit being comprised of a signal input, a first inductor and first capacitor; one end of said first inductor being connected at U. H. F. to said signal input and the other end of said first inductor being connected at U. H. F. to a terminal of said cathode; one end of said first capacitor being connected at U. H. F. to said terminal of cathode and the other end of said first capacitor being connected to ground; a terminal of said grid and said signal input being connected to ground at U. H. F.; said first inductor, said first capacitor and the inherent tube inductance between said terminals and their associated grid and cathode forming a transformation network to thereby permit a non-attenuated signal to be applied across the inherent tube input resistance.

5. A grounded grid amplifier operable at U. H. F. and having a low noise factor comprising a multi-electrode electron tube having a cathode, grid and plate; said grid of said tube being effectively connected to ground at the operating frequencies through lead inductance of said electron tube; an input circuit connected to said cathode of said tube and an output circuit connected from said plate of said tube; said input circuit being comprised of a series inductance and a shunt capacitor for compensating the cathode and grid lead inductance to thereby reduce the signal attenuation at U. H. F.; said series inductance and shunt capacitor forming in conjunction with said cathode and grid lead inductance of said tube a T network for applying a non-attenuated signal across the inherent input resistance and capacitance of said electron tube in which said series inductance, said shunt capacitor and said cathode and grid lead inductance each form one leg; a plate being comprised of a second and third inductor and a second capacitor; said second inductor and said second capacitor being connected in series with each other and with one end connected a shunt terminal of one end of said plate and other end of said series capacitor inductor connected at U. H. F. to ground; one end of said third inductor being connected at U. H. F. to the second terminal of the other end of said plate and the other end of said third inductor connected at U. H. F. to ground; an output connected across said third inductor; said plate, said second and third inductor, said second capacitor and the inherent tube plate lead inductance forming a resonant circuit.

6. A grounded grid amplifier operable at U. H. F. and having a low noise factor comprising a multi-electrode electron tube having a cathode, grid and plate; said grid of said tube being effectively connected to ground at the operating frequencies through the grid lead inductance of said electron tube; an input circuit connected to said cathode of said tube and an output circuit connected from said plate of said tube; said input circuit being comprised of a series inductance and a shunt capacitor for compensating the cathode and grid lead inductance to thereby reduce the signal attenuation at U. H. F.; said series inductance and shunt capacitor forming in conjunction with said cathode and grid lead inductance of said tube an analog transformer for applying a non-attenuated signal across the inherent input resistance and capacitance of said electron tube; a plate output circuit being connected to said plate and forming with said plate said tube and its inherent tube plate lead inductance a series resonating circuit.

References Cited in the file of this patent

UNITED STATES PATENTS

| | | |
|---|---|---|
| 2,431,333 | Labin | Nov. 25, 1947 |
| 2,463,229 | Wheeler | Mar. 1, 1949 |
| 2,546,837 | Stribling | Mar. 27, 1951 |
| 2,571,045 | Macnee | Oct. 9, 1951 |
| 2,574,868 | Green | Nov. 13, 1951 |